United States Patent
Otani et al.

(10) Patent No.: US 6,396,626 B1
(45) Date of Patent: May 28, 2002

(54) ANTIREFLECTION FILM AND OPTICAL ELEMENT COATED WITH THE ANTIREFLECTION FILM

(75) Inventors: Minoru Otani, Tokyo; Kenji Ando, Kawasaki; Yasuyuki Suzuki, Yokohama; Ryuji Biro, Kawasaki; Hidehiro Kanazawa, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 09/654,040

(22) Filed: Sep. 1, 2000

(30) Foreign Application Priority Data

Sep. 2, 1999 (JP) ............................................. 11-248156

(51) Int. Cl.$^7$ ................................................. F21V 9/04
(52) U.S. Cl. ...................... 359/359; 359/588; 359/589
(58) Field of Search ................................. 359/359, 360, 359/588, 589

(56) References Cited

U.S. PATENT DOCUMENTS

| | | | |
|---|---|---|---|
| 5,661,596 A | 8/1997 | Biro et al. ................... | 359/359 |
| 5,885,712 A | * 3/1999 | Otani et al. .................. | 428/426 |

FOREIGN PATENT DOCUMENTS

| | | |
|---|---|---|
| JP | 7-7124 | 1/1995 |
| JP | 7-218701 | 8/1995 |
| JP | 7-107563 | 11/1995 |

* cited by examiner

Primary Examiner—Cassandra Spyrou
Assistant Examiner—Alessandro V. Amari
(74) Attorney, Agent, or Firm—Fitzpatrick, Cella, Harper & Scinto

(57) ABSTRACT

The antireflection film of the present invention comprises an alternately multi-layered film of 10 layers formed on a base member and having antireflection characteristics in two wavelength regions including a first wavelength ($\lambda_1$) of 248 nm and a second wavelength ($\lambda_2$) of 633 nm as central wavelengths, respectively, the multi-layered film of 10 layers comprising: low-refractive index layers arranged at odd-numbered positions from a side opposite to the base member and having a refractive index of 1.45 to 1.52 at the first wavelength ($\lambda_1$); and high-refractive index layers arranged at even-numbered positions from the side opposite to the base member and having a refractive index of 1.65 to 1.80 at the first wavelength ($\lambda_1$), wherein layers arranged at the first, second and third positions from the side opposite to the base member each have an optical thickness ranging from $0.21\lambda_1$ to $0.28\lambda_1$.

22 Claims, 8 Drawing Sheets

ANTIREFLECTION FILM AND OPTICAL ELEMENT COATED WITH THE ANTIREFLECTION FILM

BACKGROUND OF THE INVENTION

1. Field of the Invention

The present invention relates to an antireflection film and an optical element coated with the antireflection film, and particularly to an antireflection film coated on the surface of an optical element comprising quartz as a substrate, the antireflection film having an antireflection effect in two wavelength regions of ultraviolet light having a wavelength of 248 nm, for example, KrF excimer laser beam, and light having a wavelength of 633 nm, which is visible light, for example, He-Ne laser beam.

2. Related Background Art

As conventional anti-reflection films for two wavelength regions, the first being a region of ultraviolet light having a wavelength of 300 nm or shorter and the second being a region of visible light, films utilizing an oxide film and a fluoride film are disclosed in Japanese Patent Publication Nos. 7-7124 and 7-107563. Anti-reflection films having a film structure of six layers using an oxide film are disclosed in Japanese Patent Application Laid-Open No. 7-218701.

In the above-described conventional cases, however, the use of the fluoride film has created a problem in that low environmental resistance of this film easily degrades performance. On the other hand, the film having a structure in which only the oxide film, which is excellent in environmental resistance, is used has narrow bandwidth.

SUMMARY OF THE INVENTION

It is an object of the present invention to solve the above-described problems and provide a high-performance antireflection film having good antireflection characteristics in two wavelength regions of ultraviolet light having a wavelength of 248 nm and visible light having a wavelength of 633 nm and excellent durability, and an optical element coated with the antireflection film.

Another object of the present invention is to provide an antireflection film comprising an alternately multi-layered film of 10 layers formed on a base member and having antireflection characteristics in two wavelength regions including a first wavelength ($\lambda_1$) of 248 nm and a second wavelength ($\lambda_2$) of 633 nm as central wavelengths, respectively, the multi-layered film of 10 layers comprising:

low-refractive index layers arranged at odd-numbered positions from a side opposite to the base member and having a refractive index of 1.45 to 1.52 at the first wavelength ($\lambda_1$); and high-refractive index layers arranged at even-numbered positions from the side opposite to the base member and having a refractive index of 1.65 to 1.80 at the first wavelength ($\lambda_1$), wherein layers arranged at the first, second and third positions from the side opposite to the base member each have an optical thickness ranging from $0.21\lambda_1$ to $0.28\lambda_1$.

Still another object of the present invention is to provide an optical element comprising:

a base member; and an antireflection film comprising an alternately multi-layered film of 10 layers formed on the base member and having antireflection characteristics in two wavelength regions including a first wavelength ($\lambda_1$) of 248 nm and a second wavelength, ($\lambda_2$) of 633 nm as central wavelengths, respectively, wherein the multi-layered film of 10 layers comprises:

low-refractive index layers arranged at odd-numbered positions from a side opposite to the base member and having a refractive index of 1.45 to 1.52 at the first wavelength ($\lambda_1$); and high-refractive index layers arranged at even-numbered positions from the side opposite to the base member and having a refractive index of 1.65 to 1.80 at the first wavelength ($\lambda_1$), and wherein layers arranged at the first, second and third positions from the side opposite to the base member each have an optical thickness ranging from $0.21\lambda_1$ to $0.28\lambda_1$.

A further object of the present invention is to provide an antireflection film comprising an alternately multi-layered film of 8 layers formed on a base member and having antireflection characteristics in two wavelength regions including a first wavelength ($\lambda_1$) of 248 nm and a second wavelength ($\lambda_2$) of 633 nm as central wavelengths, respectively, the multi-layered film of 8 layers comprising:

low-refractive index layers arranged at odd-numbered positions from a side opposite to the base member and having a refractive index of 1.45 to 1.52 at the first wavelength ($\lambda_1$); and high-refractive index layers arranged at even-numbered positions from the side opposite to the base member and having a refractive index of 1.65 to 1.80 at the first wavelength ($\lambda_1$), wherein layers arranged at the first, second and third positions from the side opposite to the base member each have an optical thickness ranging from $0.23\lambda_1$ to $0.28\lambda_1$.

A still further object of the present invention is to provide an optical element comprising:

a base member; and an antireflection film comprising an alternately multi-layered film of 8 layers formed on the base member and having antireflection characteristics in two wavelength regions including a first wavelength ($\lambda_1$) of 248 nm and a second wavelength ($\lambda_2$) of 633 nm as central wavelengths, respectively, wherein the multi-layered film of 8 layers comprises:

low-refractive index layers arranged at odd-numbered positions from a side opposite to the base member and having a refractive index of 1.45 to 1.52 at the first wavelength ($\lambda_1$); and high-refractive index layers arranged at even-numbered positions from the side opposite side to the base member and having a refractive index of 1.65 to 1.80 at the first wavelength ($\lambda_1$), and wherein layers arranged at the first, second and third positions from the side opposite to the base member each have an optical thickness ranging from $0.23\lambda_1$ to $0.28\lambda_1$.

DETAILED DESCRIPTION OF THE PREFERRED EMBODIMENTS

Figure 1:
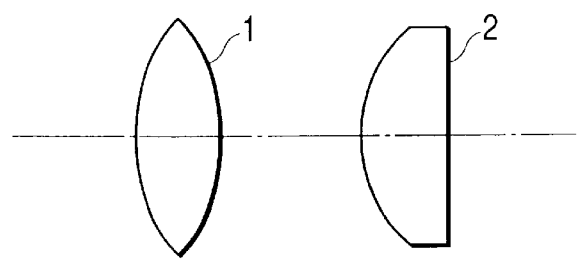
FIG. 1 is a schematic cross-sectional view illustrating an optical system using an antireflection film according to the present invention.

FIG. 1 is a schematic cross-sectional view illustrating an optical system using an antireflection film which will be described subsequently. In FIG. 1, reference numerals 1 and 2 respectively indicate lenses which are optical elements. An antireflection film is formed on the light-incidence plane and light-outgoing plane of these lenses 1 and 2.

Figure 2:
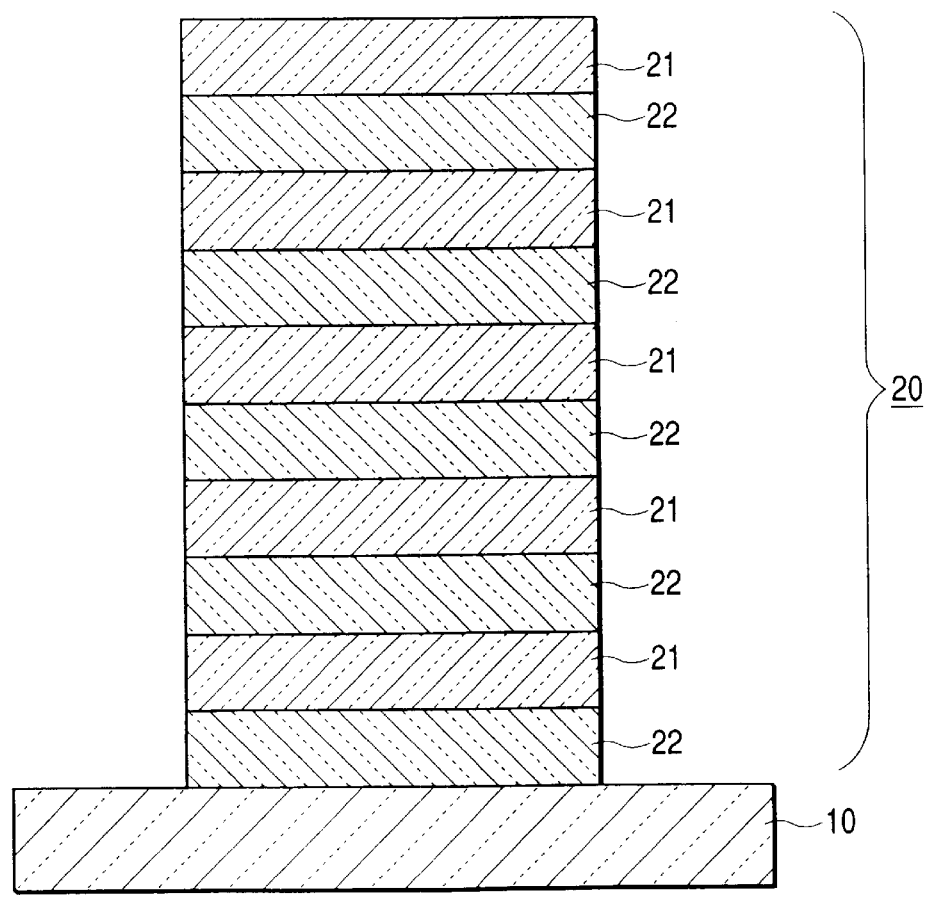
FIG. 2 is a schematic cross-sectional view illustrating the film structure of an antireflection film according to a first embodiment of the present invention.

FIG. 2 is a schematic cross-sectional view illustrating the film structure of an antireflection film according to a first embodiment of the present invention. The film according to this embodiment is a two-wavelength antireflection film having antireflection characteristics in two wavelength regions including a first wavelength ($\lambda_1$) of 248 nm and a second wavelength ($\lambda_2$) of 633 nm as central wavelengths, respectively. In this embodiment, as the antireflection film, an alternately multi-layered film 20 is formed by alternately stacking five low-refractive index layers 21 and five high-refractive index layers 22, i.e., 10 layers in total, on a substrate 10 (base member of an optical element to be coated) such as quartz.

The layers (odd-numbered layers) arranged at odd-numbered positions from the air medium side (opposite side to the substrate) toward the substrate side, i.e., the first, third, fifth, seventh and ninth layers, are low-refractive index layers 21 each comprising $SiO_2$ or the like as a main component, and the layers (even-numbered layers) arranged at even-numbered positions, i.e., the second, fourth, sixth, eighth and tenth layers, are high-refractive index films 22 each comprising $Al_2O_3$ or the like as a main component. A layer-forming material for the low-refractive index layers 21 is selected in such a manner that the refractive index of each low-refractive index layer is 1.45 to 1.52 at the first wavelength ($\lambda_1$), while a layer-forming material for the high-refractive index layers 22 is selected in such a manner that the refractive index of each high-refractive index layer is 1.65 to 1.80 at the first wavelength ($\lambda_1$).

The optical thicknesses, $d_1$, $d_2$ and $d_3$ of the first, second and third layers are each preset so as to fall within a range of from $0.21\lambda_1$ to $0.28\lambda_1$.

The optical thickness of each layer in the alternately multi-layered film 20 is optimized under such conditions, whereby the two-wavelength antireflection film having good antireflection characteristics in two wavelength regions of an ultraviolet region of the first wavelength of 248 nm and a visible region of the second wavelength of 633 nm can be realized.

When the respective optical thicknesses, $d_1$, $d_2$, $d_3$, $d_4$, $d_5$, $d_6$, $d_7$, $d_8$, $d_9$ and $d_{10}$ of the first, second, third, fourth, fifth, sixth, seventh, eighth, ninth and tenth layers in the alternately multi-layered film 20 of 10-layer structure fall within ranges satisfying their corresponding relationships shown below, a good two-wavelength antireflection film is provided.

$0.21\lambda_1 \leq d_1 \leq 0.28\lambda_1$
$0.21\lambda_1 \leq d_2 \leq 0.28\lambda_1$
$0.21\lambda_1 \leq d_3 \leq 0.28\lambda_1$
$0.30\lambda_1 \leq d_4 \leq 0.35\lambda_1$
$0.12\lambda_1 \leq d_5 \leq 0.22\lambda_1$
$0.10\lambda_1 \leq d_6 \leq 0.20\lambda_1$
$0.50\lambda_1 \leq d_7 \leq 0.70\lambda_1$
$0.20\lambda_1 \leq d_8 \leq 0.35\lambda_1$
$1.00\lambda_1 \leq d_9 \leq 1.35\lambda_1$
$0.35\lambda_1 \leq d_{10} \leq 0.75\lambda_1$ When the respective optical thicknesses, $d_1$, $d_2$, $d_3$, $d_4$, $d_5$, $d_6$, $d_7$, $d_8$, $d_9$ and $d_{10}$ of the first, second, third, fourth, fifth, sixth, seventh, eighth, ninth and tenth layers in the alternately multi-layered film 20 of 10-layer structure as another specific design example fall within ranges satisfying their corresponding relationships shown below, a good 2-wavelength antireflection film is provided.

$0.21\lambda_1 \leq d_1 \leq 0.28\lambda_1$
$0.21\lambda_1 \leq d_2 \leq 0.28\lambda_1$
$0.21\lambda_1 \leq d_3 \leq 0.28\lambda_1$
$0.30\lambda_1 \leq d_4 \leq 0.48\lambda_1$
$0.01\lambda_1 \leq d_5 \leq 1.15\lambda_1$
$0.22\lambda_1 \leq d_6 \leq 0.41\lambda_1$
$0.39\lambda_1 \leq d_7 \leq 0.60\lambda_1$
$0.65\lambda_1 \leq d_8 \leq 0.85\lambda_1$
$0.24\lambda_1 \leq d_9 \leq 0.45\lambda_1$
$0.32\lambda_1 \leq d_{10} \leq 0.58\lambda_1$ When the respective optical thicknesses, $d_1$, $d_2$, $d_3$, $d_4$, $d_5$, $d_6$, $d_7$, $d_8$, $d_9$ and $d_{10}$ of the first, second, third, fourth, fifth, sixth, seventh, eighth, ninth and tenth layers in the alternately multi-layered film 20 of 10-layer structure as a further specific design example fall within ranges satisfying their corresponding relationships shown below, a good two-wavelength antireflection film is provided.

$0.21\lambda_1 \leq d_1 \leq 0.28\lambda_1$ $0.21\lambda_1 \leq d_2 \leq 0.28\lambda_1$ $0.21\lambda_1 \leq d_3 \leq 0.28\lambda_1$ $0.22\lambda_1 \leq d_4 \leq 0.46\lambda_1$ $0.05\lambda_1 \leq d_5 \leq 1.28\lambda_1$ $0.01\lambda_1 \leq d_6 \leq 0.25\lambda_1$ $0.55\lambda_1 \leq d_7 \leq 0.80\lambda_1$ $0.55\lambda_1 \leq d_8 \leq 0.85\lambda_1$ $0.01\lambda_1 \leq d_9 \leq 0.15\lambda_1$ $0.01\lambda_1 \leq d_{10} \leq 0.15\lambda_1$ In the alternately multi-layered film 20, the high-refractive index layers 22 are desirably formed from an oxide film comprising, as a main component, $Al_2O_3$ or the like excellent in environmental resistance, while the low-refractive index layers 21 are desirably formed from an oxide film comprising, as a main component, $SiO_2$ or the like excellent in environmental resistance.

When the alternately multi-layered film 20 is formed with the oxide films alone as described above, a high-performance, two-wavelength antireflection film having desired antireflection characteristics in two wavelength regions of an ultraviolet region and a visible region and excellent durability can be realized.

EXAMPLE 1

Figure 3:
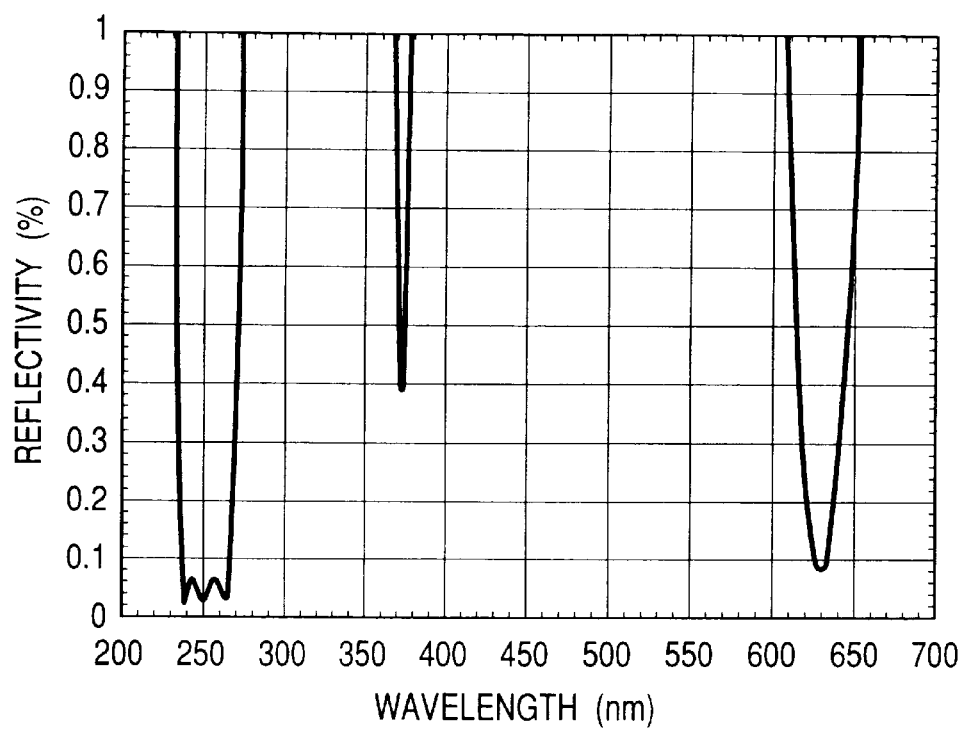
FIG. 3 is a graph showing the reflection characteristics of an antireflection film according to Example 1 of the present invention in a wavelength range of from 200 nm to 700 nm.
Figure 4:
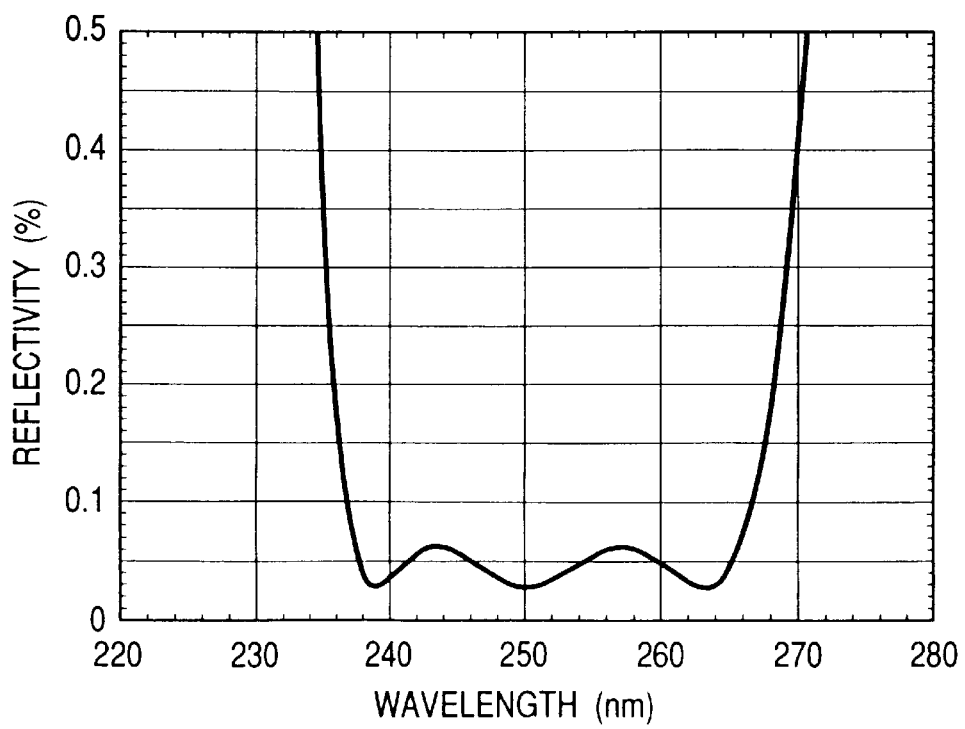
FIG. 4 is an enlarged graph showing the reflection characteristics of the antireflection film according to Example 1 of the present invention in the vicinity of a wavelength of 248 nm.

A two-wavelength antireflection film having an antireflection effect on both ultraviolet light having a wavelength of 248 nm and visible light having a wavelength of 633 nm was formed on a substrate made of synthetic quartz glass with a film structure shown in Table 1 by using a vacuum deposition method. The reflection characteristics of the thus-formed antireflection film in a wavelength range of from 200 nm to 700 nm are diagrammatically illustrated in FIG. 3. The reflection characteristics in the vicinity of a wavelength of 248 nm are diagrammatically illustrated on an enlarged scale in FIG. 4.

From these drawings, it is understood that the antireflection film according to Example 1 has good two-wavelength antireflection characteristics exhibiting a low reflectivity over a wide band width as demonstrated by a reflectivity of 0.06% or lower and a 0.2%-reflectivity wavelength width of 34 nm at a wavelength of 248 nm, and a reflectivity of 0.2% or lower at a wavelength of 633 nm.

EXAMPLE 2

Figure 5:
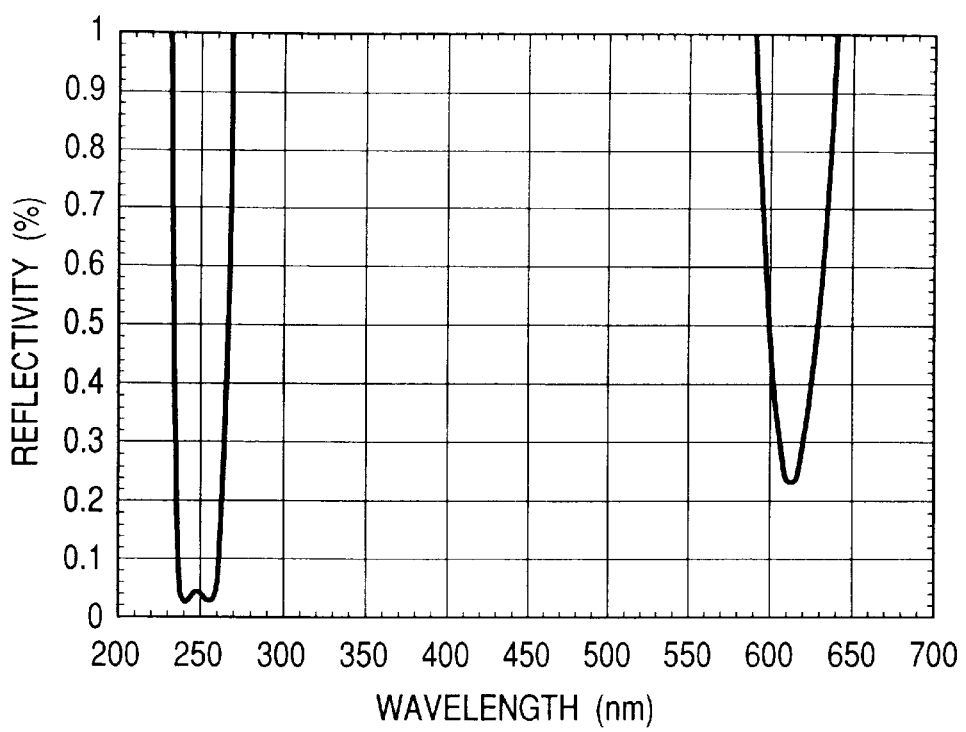
FIG. 5 is a graph showing the reflection characteristics of an antireflection film according to Example 2 of the present invention in a wavelength range of from 200 nm to 700 nm.
Figure 6:
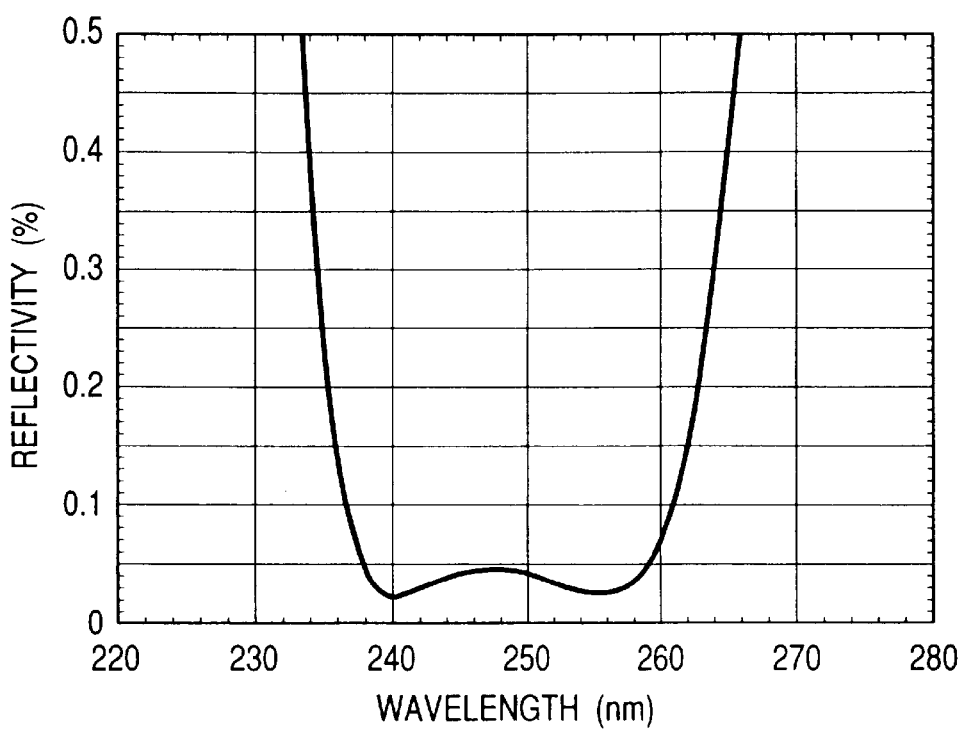
FIG. 6 is an enlarged graph showing the reflection characteristics of the antireflection film according to Example 2 of the present invention in the vicinity of a wavelength of 248 nm.

A two-wavelength antireflection film having an antireflection effect on both of ultraviolet light having a wavelength of 248 nm and visible light having a wavelength of 633 nm was formed on a substrate made of synthetic quartz glass with a film structure shown in Table 2 by using a sputtering method. The reflection characteristics of the thus-formed antireflection film in a wavelength range of from 200 nm to 700 nm are diagrammatically illustrated in FIG. 5. The reflection characteristics in the vicinity of a wavelength of 248 nm are diagrammatically illustrated on an enlarged scale in FIG. 6.

From these drawings, it is understood that the antireflection film according to Example 2 has good two-wavelength antireflection characteristics exhibiting a low reflectivity over a wide band width as demonstrated by a reflectivity of 0.05% or lower and a 0.2%-reflectivity wavelength width of 28 nm at a wavelength of 248 nm, and a reflectivity of 0.5% or lower at a wavelength of 633 nm.

EXAMPLE 3

Figure 7:
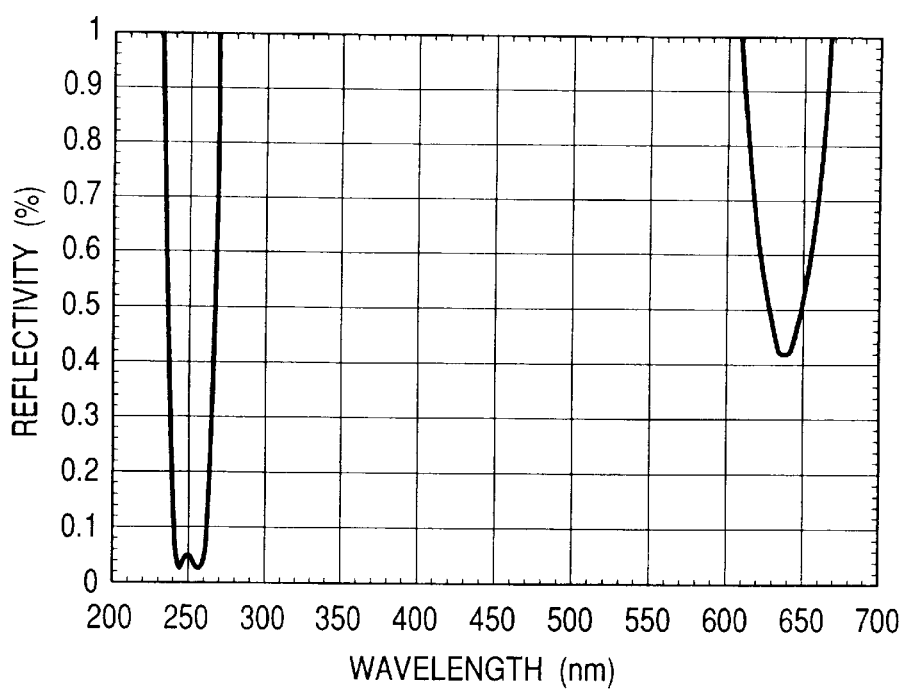
FIG. 7 is a graph showing the reflection characteristics of an antireflection film according to Example 3 of the present invention in a wavelength range of from 200 nm to 700 mm.
Figure 8:
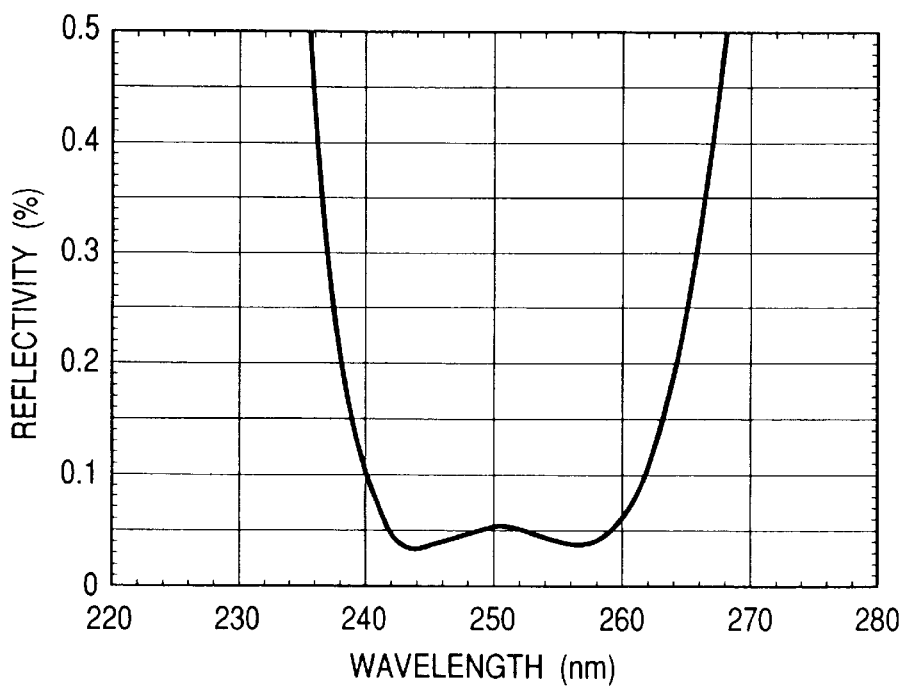
FIG. 8 is an enlarged graph showing the reflection characteristics of the antireflection film according to Example 3 of the present invention in the vicinity of a wavelength of 248 nm.

A two-wavelength antireflection film having an antireflection effect on both of ultraviolet light having a wavelength of 248 nm and visible light having a wavelength of 633 nm was formed on a substrate made of synthetic quartz glass with a film structure shown in Table 3 by using a sputtering method. The reflection characteristics of the thus-formed antireflection film in a wavelength range of from 200 nm to 700 nm are diagrammatically illustrated in FIG. 7. The reflection characteristics in the vicinity of a wavelength of 248 nm are diagrammatically illustrated on an enlarged scale in FIG. 8.

From these drawings, it is understood that the antireflection film according to Example 3 has good two-wavelength antireflection characteristics exhibiting a low reflectivity over a wide band width as demonstrated by a reflectivity of 0.05% or lower and a 0.2%-reflectivity wavelength width of 26 nm at a wavelength of 248 nm, and a reflectivity of 0.5% or lower at a wavelength of 633 nm.

Figure 9:
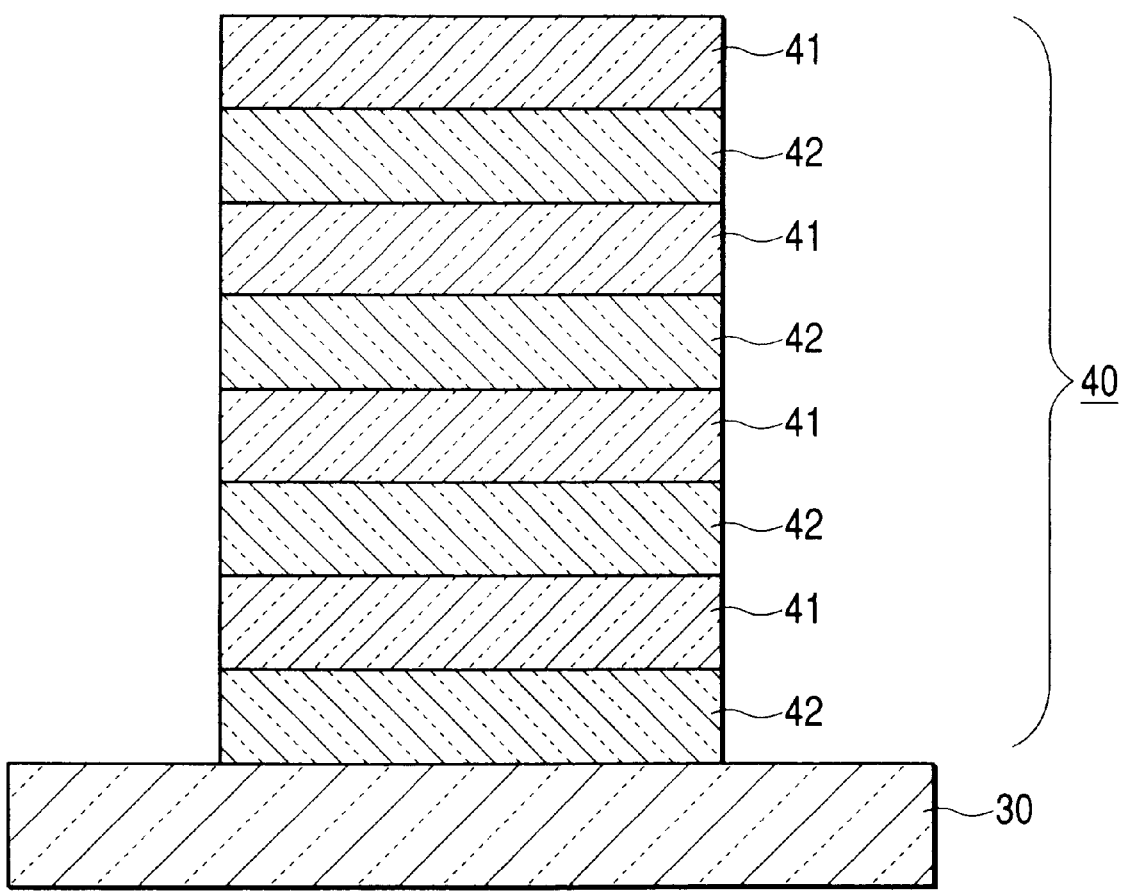
FIG. 9 is a schematic cross-sectional view illustrating the film structure of an antireflection film according to a second embodiment of the present invention.

FIG. 9 is a schematic cross-sectional view illustrating the film structure of an antireflection film according to a second embodiment of the present invention. The film according to this embodiment is a two-wavelength antireflection film having antireflection characteristics in two wavelength regions including a first wavelength ($\lambda_1$) of 248 nm and a second wavelength ($\lambda_2$) of 633 nm as central wavelengths, respectively. In this embodiment, as the antireflection film, an alternately multi-layered film 40 is formed by alternately stacking four low-refractive index layers 41 and four high-refractive index layers 42, i. e., 8 layers in total, on a substrate 30 (base member of an optical element to be coated) such as quartz.

The layers (odd-numbered layers) arranged at odd-numbered positions from the air medium side (opposite side to the substrate) toward the substrate side, i.e., the first, third, fifth and seventh layers, are low-refractive index layers 41 each comprising $SiO_2$ or the like as a main component, and the layers (even-numbered layers) arranged at even-numbered positions, i.e., the second, fourth, sixth and eighth layers, are high-refractive index layers 42 each comprising $Al_2O_3$ or the like as a main component. A layer-forming material for the low-refractive index layers 41 is selected in such a manner that the refractive index of each low-refractive index film is 1.45 to 1.52 at the first wavelength ($\lambda_1$), while a layer-forming material for the high-refractive index layers 42 is selected in such a manner that the refractive index of each high-refractive index film is 1.65 to 1.80 at the first wavelength, $\lambda_1$.

The optical thicknesses, $d_1$, $d_2$ and $d_3$ of the first, second and third layers are each preset so as to fall within a range of from $0.23\lambda_1$ to $0.28\lambda_1$.

The optical thickness of each layer in the alternately multi-layered film 40 is optimized under such conditions, whereby the two-wavelength antireflection film having good antireflection characteristics in two wavelength regions of an ultraviolet region of the first wavelength of 248 nm and a visible region of the second wavelength of 633 nm can be realized.

When the respective optical thicknesses, $d_1$, $d_2$, $d_3$, $d_4$, $d_5$, $d_6$, $d_7$ and $d_8$ of the first, second, third, fourth, fifth, sixth, seventh and eighth layers in the alternately multi-layered film 40 of 8-layer structure fall within ranges satisfying their corresponding relationships shown below, a good two-wavelength antireflection film is provided.

$0.23\lambda_1 \leq d_1 \leq 0.28\lambda_1$
$0.23\lambda_1 \leq d_2 \leq 0.28\lambda_1$
$0.23\lambda_1 \leq d_3 \leq 0.28\lambda_1$
$0.72\lambda_1 \leq d_4 \leq 0.80\lambda_1$
$0.44\lambda_1 \leq d_5 \leq 0.52\lambda_1$
$0.76\lambda_1 \leq d_6 \leq 0.85\lambda_1$
$0.33\lambda_1 \leq d_7 \leq 0.41\lambda_1$
$0.40\lambda_1 \leq d_8 \leq 0.51\lambda_1$ When the respective optical thicknesses, $d_1$, $d_2$, $d_3$, $d_4$, $d_5$, $d_6$, $d_7$ and $d_8$ of the first, second, third, fourth, fifth, sixth, seventh and eighth layers in the alternately multi-layered film 40 of 8-layer structure as another specific design example fall within ranges satisfying their corresponding relationships shown below, a good two-wavelength antireflection film is provided.

$0.23\lambda_1 \leq d_1 \leq 0.28\lambda_1$
$0.23\lambda_1 \leq d_2 \leq 0.28\lambda_1$
$0.23\lambda_1 \leq d_3 \leq 0.28\lambda_1$
$0.72\lambda_1 \leq d_4 \leq 0.80\lambda_1$
$0.44\lambda_1 \leq d_5 \leq 0.52\lambda_1$
$0.82\lambda_1 \leq d_6 \leq 0.92\lambda_1$
$0.25\lambda_1 \leq d_7 \leq 0.35\lambda_1$
$0.43\lambda_1 \leq d_8 \leq 0.53\lambda_1$ When the respective optical thicknesses, $d_1$, $d_2$, $d_3$, $d_4$, $d_5$, $d_6$, $d_7$ and $d_8$ of the first, second, third, fourth, fifth, sixth, seventh and eighth layers in the alternately multi-layered film 40 of 8-layer structure as a further specific design example fall within ranges satisfying their corresponding relationships shown below, a good two-wavelength antireflection film is provided.

$0.23\lambda_1 \leq d_1 \leq 0.28\lambda_1$
$0.23\lambda_1 \leq d_2 \leq 0.28\lambda_1$
$0.23\lambda_1 \leq d_3 \leq 0.28\lambda_1$
$0.23\lambda_1 \leq d_4 \leq 0.28\lambda_1$
$1.00\lambda_1 \leq d_5 \leq 1.20\lambda_1$
$0.52\lambda_1 \leq d_6 \leq 0.65\lambda_1$
$0.22\lambda_1 \leq d_7 \leq 0.31\lambda_1$
$0.96\lambda_1 \leq d_8 \leq 1.12\lambda_1$ In the alternately multi-layered film 40, the high-refractive index layers 42 are desirably formed from an oxide film comprising, as a main component, $Al_2O_3$ or the like excellent in environmental resistance, while the low-refractive index layers 41 are desirably formed from an oxide film comprising, as a main component, $SiO_2$ or the like excellent in environmental resistance.

When the alternately multi-layered film 40 is formed with the oxide films alone as described above, a high performance, two-wavelength antireflection film having desired antireflection characteristics in two wavelength regions of an ultraviolet region and a visible region and excellent durability can be realized.

EXAMPLE 4

Figure 10:
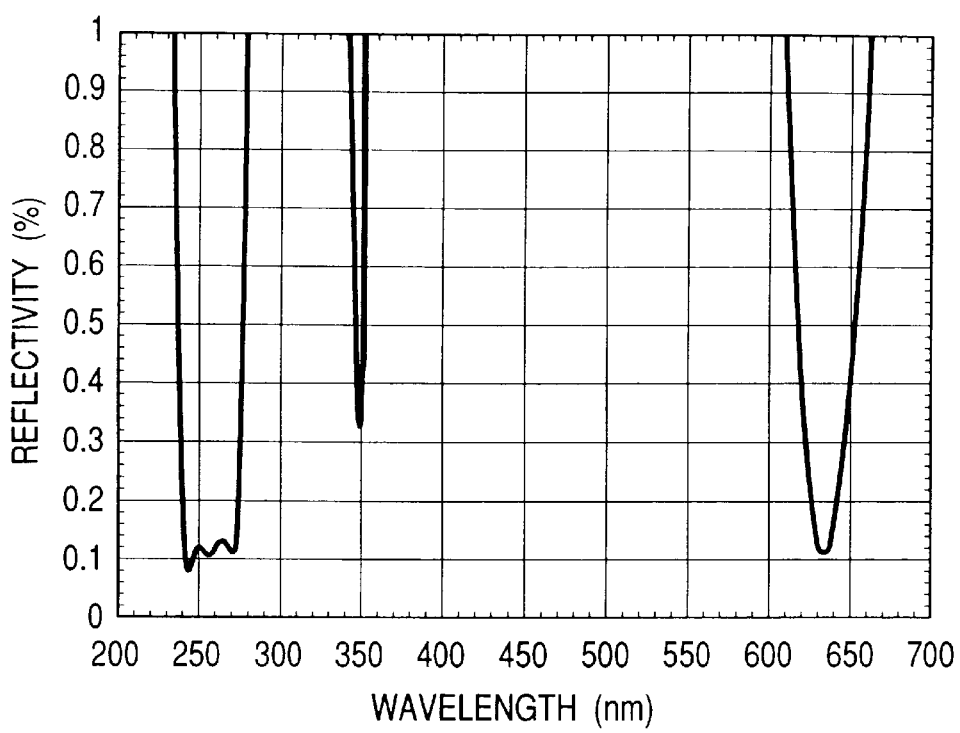
FIG. 10 is a graph showing the reflection characteristics of an antireflection film according to Example 4 of the present invention in a wavelength range of from 200 nm to 700 nm.
Figure 11:
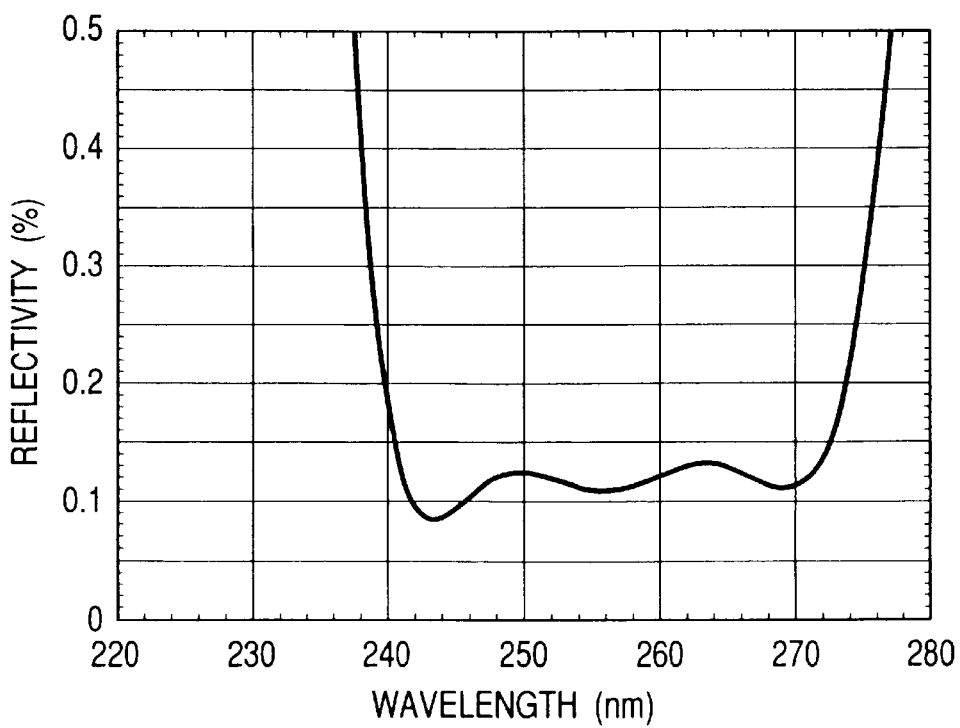
FIG. 11 is an enlarged graph showing the reflection characteristics of the antireflection film according to Example 4 of the present invention in the vicinity of a wavelength of 248 nm.

A two-wavelength antireflection film having an antireflection effect on both of ultraviolet light having a wavelength of 248 nm and visible light having a wavelength of 633 nm was formed on a substrate made of synthetic quartz glass with a film structure shown in Table 4 by using a vacuum deposition method. The reflection characteristics of the thus-formed antireflection film in a wavelength range of from 200 nm to 700 nm are diagrammatically illustrated in FIG. 10. The reflection characteristics in the vicinity of a wavelength of 248 nm are diagrammatically illustrated on an enlarged scale in FIG. 11.

From these drawings, it is understood that the antireflection film according to Example 4 has good two-wavelength antireflection characteristics exhibiting a low reflectivity over a wide band width as demonstrated by a reflectivity of 0.15% or lower and a 0.15%-reflectivity wavelength width of 32 nm at a wavelength of 248 nm, and a reflectivity of 0.2% or lower at a wavelength of 633 nm.

EXAMPLE 5

Figure 12:
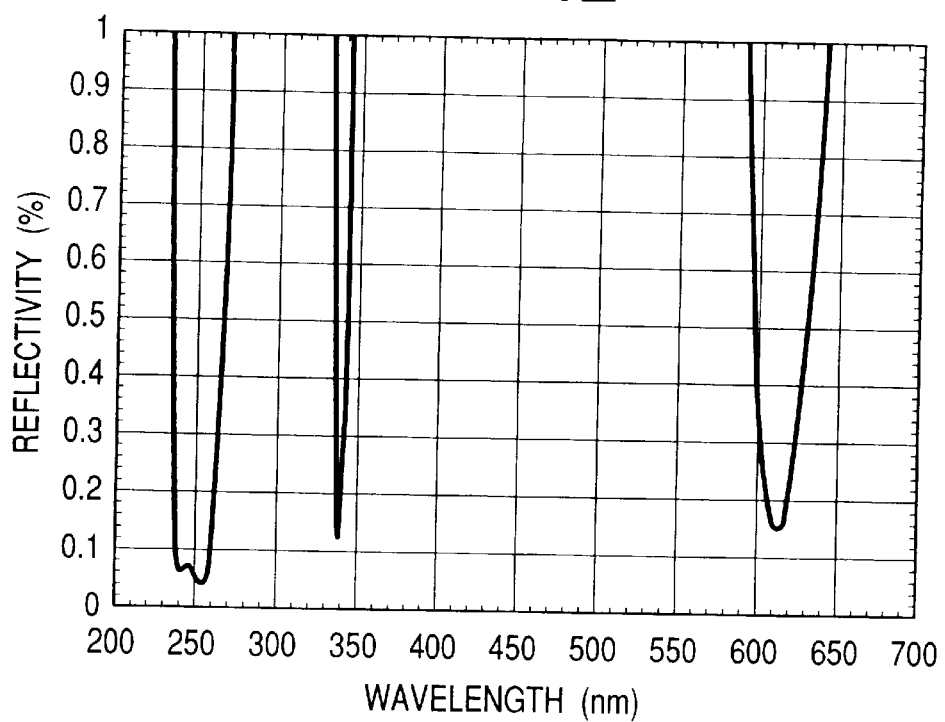
FIG. 12 is a graph showing the reflection characteristics of an antireflection film according to Example 5 of the present invention in a wavelength range of from 200 nm to 700 nm.
Figure 13:
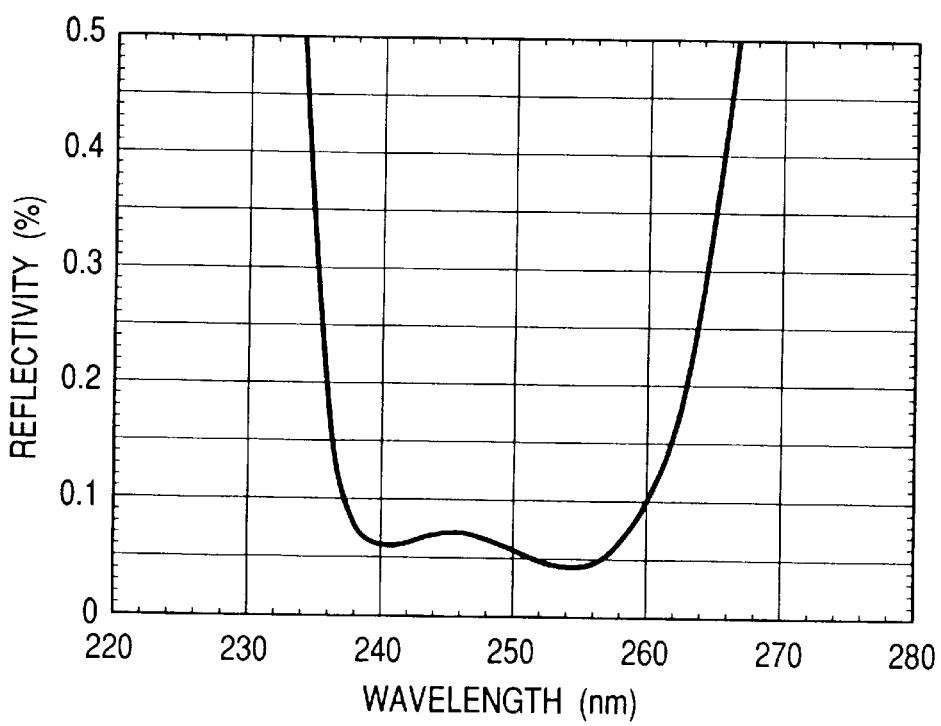
FIG. 13 is an enlarged graph showing the reflection characteristics of the antireflection film according to Example 5 of the present invention in the vicinity of a wavelength of 248 nm.

A two-wavelength antireflection film having an antireflection effect on both of ultraviolet light having a wavelength of 248 nm and visible light having a wavelength of 633 nm was formed on a substrate made of synthetic quartz glass with a film structure shown in Table 5 by using a sputtering method. The reflection characteristics of the thus-formed antireflection film in a wavelength range of from 200 nm to 700 nm are diagrammatically illustrated in FIG. 12. The reflection characteristics in the vicinity of a wavelength of 248 nm are diagrammatically illustrated on an enlarged scale in FIG. 13.

From these drawings, it is understood that the antireflection film according to Example 5 has good two-wavelength antireflection characteristics exhibiting a low reflectivity over a wide band width as demonstrated by a reflectivity of 0.1% or lower and a 0.1%-reflectivity wavelength width of 22 nm at a wavelength of 248 nm, and a reflectivity of 0.4% or lower at a wavelength of 633 nm.

EXAMPLE 6

Figure 14:
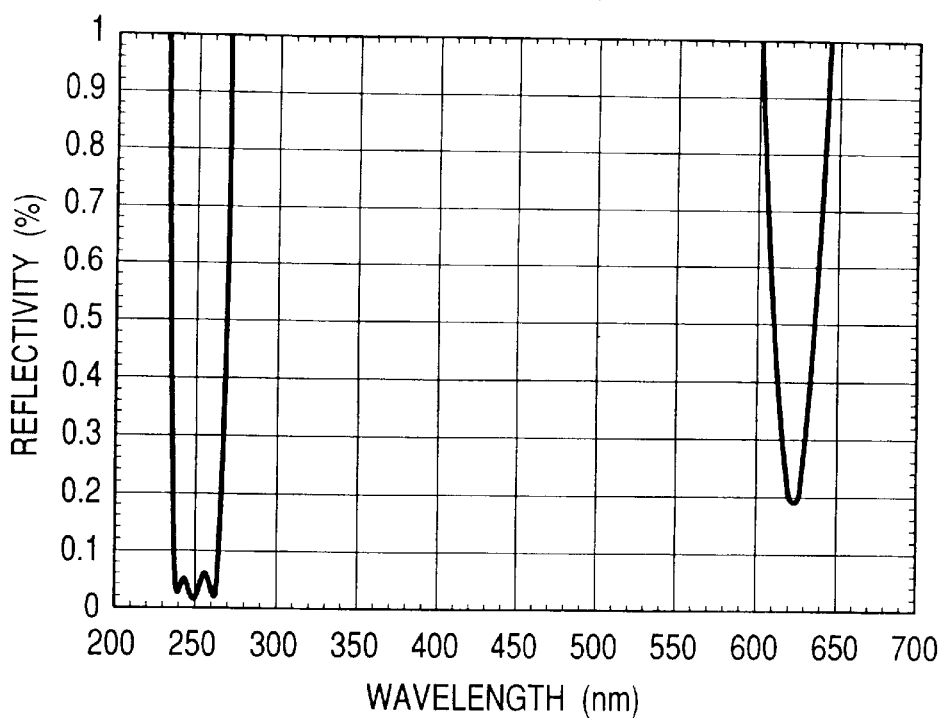
FIG. 14 is a graph showing the reflection characteristics of an antireflection film according to Example 6 of the present invention in a wavelength range of from 200 nm to 700 nm.
Figure 15:
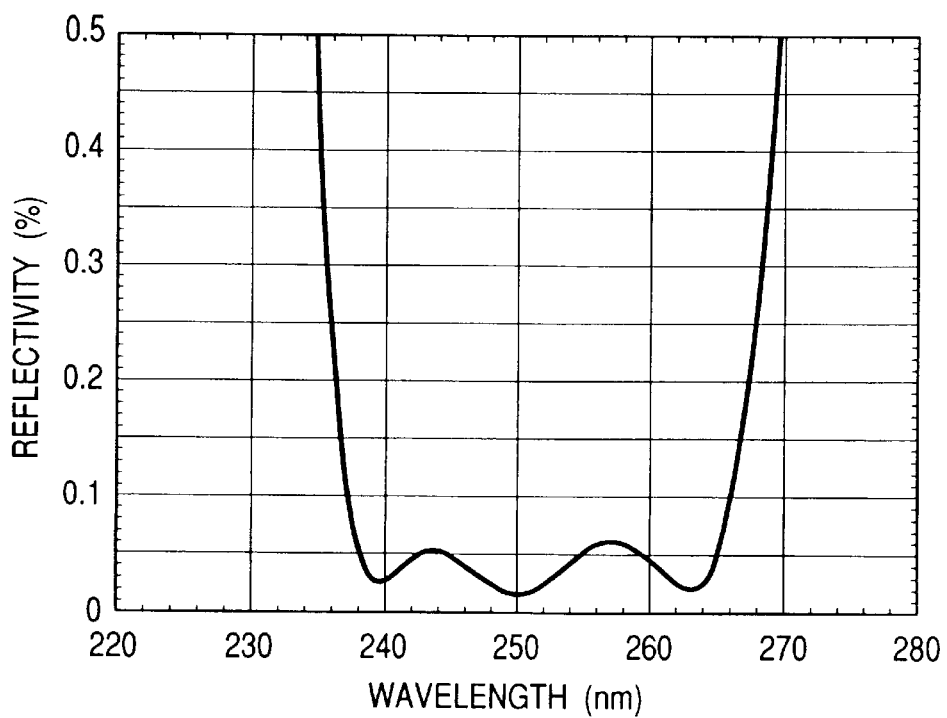
FIG. 15 is an enlarged graph showing the reflection characteristics of the antireflection film according to Example 6 of the present invention in the vicinity of a wavelength of 248 nm.

A two-wavelength antireflection film having an antireflection effect on both of ultraviolet light having a wavelength of 248 nm and visible light having a wavelength of 633 nm was formed on a substrate made of synthetic quartz glass with a film structure shown in Table 6 by using a sputtering method. The reflection characteristics of the thus-formed antireflection film in a wavelength range of from 200 nm to 700 nm are diagrammatically illustrated in FIG. 14. The reflection characteristics in the vicinity of a wavelength of 248 nm are diagrammatically illustrated on an enlarged scale in FIG. 15.

From these drawings, it is understood that the antireflection film according to Example 6 has good two-wavelength antireflection characteristics exhibiting a low reflectivity over a wide band width as demonstrated by a reflectivity of 0.1% or lower and a 0.1%-reflectivity wavelength width of 28 nm at a wavelength of 248 nm, and a reflectivity of 0.5% or lower at a wavelength of 633 nm.

Since the present invention is constituted as described above, two-wavelength antireflection films having extremely effective and good antireflection characteristics in two wavelength regions of ultraviolet light having a wavelength of 248 nm and visible light having a wavelength of 633 nm as well as excellent durability can be realized.

TABLE 1

|  | Material | Refractive index (248 nm) | Optical thickness (nm) |
|---|---|---|---|
| Medium | Air | 1 |  |
| First layer | $SiO_2$ | 1.508 | $0.257\lambda_1$ |
| Second layer | $Al_2O_3$ | 1.713 | $0.241\lambda_1$ |
| Third layer | $SiO_2$ | 1.508 | $0.271\lambda_1$ |
| Fourth layer | $Al_2O_3$ | 1.713 | $0.325\lambda_1$ |
| Fifth layer | $SiO_2$ | 1.508 | $0.163\lambda_1$ |
| Sixth layer | $Al_2O_3$ | 1.713 | $0.144\lambda_1$ |
| Seventh layer | $SiO_2$ | 1.508 | $0.612\lambda_1$ |
| Eighth layer | $Al_2O_3$ | 1.713 | $0.282\lambda_1$ |
| Ninth layer | $SiO_2$ | 1.508 | $1.165\lambda_1$ |
| Tenth layer | $Al_2O_3$ | 1.713 | $0.541\lambda_1$ |
| Substrate | Quartz | 1.508 |  |

TABLE 2

|  | Material | Defractive index (248 nm) | Optical thickness (nm) |
|---|---|---|---|
| Medium | Air | 1 |  |
| First layer | $SiO_2$ | 1.508 | $0.251\lambda_1$ |
| Second layer | $Al_2O_3$ | 1.713 | $0.225\lambda_1$ |
| Third layer | $SiO_2$ | 1.508 | $0.275\lambda_1$ |
| Fourth layer | $Al_2O_3$ | 1.713 | $0.383\lambda_1$ |
| Fifth layer | $SiO_2$ | 1.508 | $0.056\lambda_1$ |
| Sixth layer | $Al_2O_3$ | 1.713 | $0.314\lambda_1$ |
| Seventh layer | $SiO_2$ | 1.508 | $0.490\lambda_1$ |
| Eighth layer | $Al_2O_3$ | 1.713 | $0.743\lambda_1$ |
| Ninth layer | $SiO_2$ | 1.508 | $0.343\lambda_1$ |
| Tenth layer | $Al_2O_3$ | 1.713 | $0.464\lambda_1$ |
| Substrate | Quartz | 1.508 |  |

TABLE 3

|  | Material | Defractive index (248 nm) | Optical thickness (nm) |
|---|---|---|---|
| Medium | Air | 1 |  |
| First layer | $SiO_2$ | 1.508 | $0.269\lambda_1$ |
| Second layer | $Al_2O_3$ | 1.713 | $0.229\lambda_1$ |
| Third layer | $SiO_2$ | 1.508 | $0.255\lambda_1$ |
| Fourth layer | $Al_2O_3$ | 1.713 | $0.340\lambda_1$ |
| Fifth layer | $SiO_2$ | 1.508 | $0.147\lambda_1$ |
| Sixth layer | $Al_2O_3$ | 1.713 | $0.105\lambda_1$ |
| Seventh layer | $SiO_2$ | 1.508 | $0.674\lambda_1$ |
| Eighth layer | $Al_2O_3$ | 1.713 | $0.660\lambda_1$ |
| Ninth layer | $SiO_2$ | 1.508 | $0.097\lambda_1$ |
| Tenth layer | $Al_2O_3$ | 1.713 | $0.064\lambda_1$ |
| Substrate | Quartz | 1.508 |  |

TABLE 4

|  | Material | Defractive index (248 nm) | Optical thickness (nm) |
|---|---|---|---|
| Medium | Air | 1 |  |
| First layer | $SiO_2$ | 1.508 | $0.253\lambda_1$ |
| Second layer | $Al_2O_3$ | 1.713 | $0.266\lambda_1$ |
| Third layer | $SiO_2$ | 1.508 | $0.248\lambda_1$ |
| Fourth layer | $Al_2O_3$ | 1.713 | $0.770\lambda_1$ |
| Fifth layer | $SiO_2$ | 1.508 | $0.486\lambda_1$ |
| Sixth layer | $Al_2O_3$ | 1.713 | $0.807\lambda_1$ |
| Seventh layer | $SiO_2$ | 1.508 | $0.379\lambda_1$ |
| Eighth layer | $Al_2O_3$ | 1.713 | $0.458\lambda_1$ |
| Substrate | Quartz | 1.508 |  |

TABLE 5

|  | Material | Defractive index (248 nm) | Optical thickness (nm) |
|---|---|---|---|
| Medium | Air | 1 |  |
| First layer | $SiO_2$ | 1.508 | $0.249\lambda_1$ |
| Second layer | $Al_2O_3$ | 1.713 | $0.240\lambda_1$ |
| Third layer | $SiO_2$ | 1.508 | $0.260\lambda_1$ |
| Fourth layer | $Al_2O_3$ | 1.713 | $0.744\lambda_1$ |
| Fifth layer | $SiO_2$ | 1.508 | $0.421\lambda_1$ |
| Sixth layer | $Al_2O_3$ | 1.713 | $0.874\lambda_1$ |
| Seventh layer | $SiO_2$ | 1.508 | $0.301\lambda_1$ |
| Eighth layer | $Al_2O_3$ | 1.713 | $0.481\lambda_1$ |
| Substrate | Quartz | 1.508 |  |

TABLE 6

|  | Material | Defractive index (248 nm) | Optical thickness (nm) |
|---|---|---|---|
| Medium | Air | 1 |  |
| First layer | $SiO_2$ | 1.508 | $0.254\lambda_1$ |
| Second layer | $Al_2O_3$ | 1.713 | $0.251\lambda_1$ |
| Third layer | $SiO_2$ | 1.508 | $0.260\lambda_1$ |
| Fourth layer | $Al_2O_3$ | 1.713 | $0.258\lambda_1$ |
| Fifth layer | $SiO_2$ | 1.508 | $1.110\lambda_1$ |
| Sixth layer | $Al_2O_3$ | 1.713 | $0.599\lambda_1$ |
| Seventh layer | $SiO_2$ | 1.508 | $0.264\lambda_1$ |
| Eighth layer | $Al_2O_3$ | 1.713 | $1.023\lambda_1$ |
| Substrate | Quartz | 1.508 |  |

What is claimed is:

1. An antireflection film comprising an alternately multi-layered film of 10 layers formed on a base member and having antireflection characteristics in two wavelength regions including a first wavelength ($\lambda_1$) of 248 nm and a second wavelength ($\lambda_2$) of 633 nm as central wavelengths, respectively, the multi-layered film of 10 layers comprising:

low-refractive index layers arranged at odd-numbered positions from a side opposite side to the base member and having a refractive index of 1.45 to 1.52 at the first wavelength ($\lambda_1$); and high-refractive index layers arranged at even-numbered positions from the side opposite to the base member and having a refractive index of 1.65 to 1.80 at the first wavelength ($\lambda_1$), wherein layers arranged at the first, second and third positions from the side opposite to the base member each have an optical thickness ranging from $0.21\lambda_1$ to $0.28\lambda_1$.

2. The antireflection film according to claim 1, wherein the optical thicknesses, $d_1$, $d_2$, $d_3$, $d_4$, $d_5$, $d_6$, $d_7$, $d_8$, $d_9$ and $d_{10}$ of the films arranged at the first, second, third, fourth, fifth, sixth, seventh, eighth, ninth and tenth positions from the side opposite to the base member satisfy the following respective relationships:

$0.21\lambda_1 \leq d_1 \leq 0.28\lambda_1$
$0.21\lambda_1 \leq d_2 \leq 0.28\lambda_1$
$0.21\lambda_1 \leq d_3 \leq 0.28\lambda_1$
$0.30\lambda_1 \leq d_4 \leq 0.35\lambda_1$
$0.12\lambda_1 \leq d_5 \leq 0.22\lambda_1$
$0.10\lambda_1 \leq d_6 \leq 0.20\lambda_1$
$0.50\lambda_1 \leq d_7 \leq 0.70\lambda_1$
$0.20\lambda_1 \leq d_8 \leq 0.35\lambda_1$
$1.00\lambda_1 \leq d_9 \leq 1.35\lambda_1$
$0.35\lambda_1 \leq d_{10} \leq 0.75\lambda_1$.

3. The antireflection film according to claim 1, wherein the optical thicknesses, $d_1$, $d_2$, $d_3$, $d_4$, $d_5$, $d_6$, $d_7$, $d_8$, $d_9$ and $d_{10}$ of the films arranged at the first, second, third, fourth, fifth, sixth, seventh, eighth, ninth and tenth positions from the side opposite to the base member satisfy the following respective relationships:

$0.21\lambda_1 \leq d_1 \leq 0.28\lambda_1$
$0.21\lambda_1 \leq d_2 \leq 0.28\lambda_1$
$0.21\lambda_1 \leq d_3 \leq 0.28\lambda_1$
$0.30\lambda_1 \leq d_4 \leq 0.48\lambda_1$
$0.01\lambda_1 \leq d_5 \leq 1.15\lambda_1$
$0.22\lambda_1 \leq d_6 \leq 0.41\lambda_1$
$0.39\lambda_1 \leq d_7 \leq 0.60\lambda_1$
$0.65\lambda_1 \leq d_8 \leq 0.85\lambda_1$
$0.24\lambda_1 \leq d_9 \leq 0.45\lambda_1$
$0.32\lambda_1 \leq d_{10} \leq 0.58\lambda_1$.

4. The antireflection film according to claim 1, wherein the optical thicknesses, $d_1$, $d_2$, $d_3$, $d_4$, $d_5$, $d_6$, $d_7$, $d_8$, $d_9$ and $d_{10}$ of the films arranged at the first, second, third, fourth, fifth, sixth, seventh, eighth, ninth and tenth positions from the side opposite to the base member satisfy the following respective relationships:

$0.21\lambda_1 \leq d_1 \leq 0.28\lambda_1$
$0.21\lambda_1 \leq d_2 \leq 0.28\lambda_1$
$0.21\lambda_1 \leq d_3 \leq 0.28\lambda_1$
$0.22\lambda_1 \leq d_4 \leq 0.46\lambda_1$
$0.05\lambda_1 \leq d_5 \leq 1.28\lambda_1$
$0.01\lambda_1 \leq d_6 \leq 0.25\lambda_1$
$0.55\lambda_1 \leq d_7 \leq 0.80\lambda_1$
$0.55\lambda_1 \leq d_8 \leq 0.85\lambda_1$
$0.01\lambda_1 \leq d_9 \leq 0.15\lambda_1$
$0.01\lambda_1 \leq d_{10} \leq 0.15\lambda_1$.

5. The antireflection film according to claim 1, wherein the high-refractive index layers are formed of a material comprising $Al_2O_3$ as a main component, and the low-refractive index layers are formed of a material comprising $SiO_2$ as a main component.

6. An optical element comprising:
   a base member; and
   an antireflection film comprising an alternately multi-layered film of 10 layers formed on the base member and having antireflection characteristics in two wavelength regions including a first wavelength ($\lambda_1$) of 248 nm and a second wavelength ($\lambda_2$) of 633 nm as central wavelengths, respectively, wherein the multi-layered film of 10 layers comprises:
   low-refractive index layers arranged at odd-numbered positions from a side opposite to the base member and having a refractive index of 1.45 to 1.52 at the first wavelength ($\lambda_1$); and
   high-refractive index layers arranged at even-numbered positions from the side opposite to the base member and having a refractive index of 1.65 to 1.80 at the first wavelength ($\lambda_1$), and wherein layers arranged at the first, second and third positions from the side opposite to the base member each have an optical thickness ranging from $0.21\lambda_1$ to $0.28\lambda_1$.

7. The optical element according to claim 6, wherein the optical thicknesses, $d_1$, $d_2$, $d_3$, $d_4$, $d_5$, $d_6$, $d_7$, d8, $d_9$ and $d_{10}$ of the films arranged at the first, second, third, fourth, fifth, sixth, seventh, eighth, ninth and tenth positions from the side opposite to the base member in the antireflection film satisfy the following respective relationships:

$0.21\lambda_1 \leq d_1 \leq 0.28\lambda_1$
$0.21\lambda_1 \leq d_2 \leq 0.28\lambda_1$
$0.21\lambda_1 \leq d_3 \leq 0.28\lambda_1$
$0.30\lambda_1 \leq d_4 \leq 0.35\lambda_1$
$0.12\lambda_1 \leq d_5 \leq 0.22\lambda_1$
$0.10\lambda_1 \leq d_6 \leq 0.20\lambda_1$
$0.50\lambda_1 \leq d_7 \leq 0.70\lambda_1$
$0.20\lambda_1 \leq d_8 \leq 0.35\lambda_1$
$1.00\lambda_1 \leq d_9 \leq 1.35\lambda_1$
$0.35\lambda_1 \leq d_{10} \leq 0.75\lambda$..

8. The optical element according to claim 6, wherein the optical thicknesses, $d_1$, $d_2$, $d_3$, $d_4$, $d_5$, $d_6$, $d_7$, $d_8$, $d_9$ and $d_{10}$ of the films arranged at the first, second, third, fourth, fifth, sixth, seventh, eighth, ninth and tenth positions from the side opposite to the base member in the antireflection film satisfy the following respective relationships:

$0.21\lambda_1 \leq d_1 \leq 0.28\lambda_1$
$0.21\lambda_1 \leq d_2 \leq 0.28\lambda_1$
$0.21\lambda_1 \leq d_3 \leq 0.28\lambda_1$
$0.30\lambda_1 \leq d_4 \leq 0.48\lambda_1$
$0.01\lambda_1 \leq d_5 \leq 1.15\lambda_1$
$0.22\lambda_1 \leq d_6 \leq 0.41\lambda_1$
$0.39\lambda_1 \leq d_7 \leq 0.60\lambda_1$
$0.65\lambda_1 \leq d_8 \leq 0.85\lambda_1$
$0.24\lambda_1 \leq d_9 \leq 0.45\lambda_1$
$0.32\lambda_1 \leq d_{10} \leq 0.58\lambda_1$.

9. The optical element according to claim 6, wherein the optical thicknesses, $d_1$, $d_2$, $d_3$, $d_4$, $d_5$, $d_6$, $d_7$, $d_8$, $d_9$ and $d_{10}$ of the films arranged at the first, second, third, fourth, fifth, sixth, seventh, eighth, ninth and tenth positions from the side opposite to the base member in the antireflection film satisfy the following respective relationships:

$0.21\lambda_1 \leq d_1 \leq 0.28\lambda_1$
$0.21\lambda_1 \leq d_2 \leq 0.28\lambda_1$
$0.21\lambda_1 \leq d_3 \leq 0.28\lambda_1$
$0.22\lambda_1 \leq d_4 \leq 0.46\lambda_1$
$0.05\lambda_1 \leq d_5 \leq 1.28\lambda_1$
$0.01\lambda_1 \leq d_6 \leq 0.25\lambda_1$
$0.55\lambda_1 \leq d_7 \leq 0.80\lambda_1$
$0.55\lambda_1 \leq d_8 \leq 0.85\lambda_1$
$0.01\lambda_1 \leq d_9 \leq 0.15\lambda_1$
$0.01\lambda_1 \leq d_{10} \leq 0.15\lambda_1$.

10. The optical element according to claim 6, wherein the high-refractive index layers are formed of a material comprising $Al_2O_3$ as a main component, and the low-refractive index layers are formed of a material comprising $SiO_2$ as a main component.

11. The optical element according to claim 6, wherein the base member is formed of quartz.

12. An antireflection film comprising an alternately multi-layered film of 8 layers formed on a base member and having antireflection characteristics in two wavelength regions including a first wavelength ($\lambda_1$) of 248 nm and a second wavelength ($\lambda_2$) of 633 nm as central wavelengths, respectively, the multi-layered film of 8 layers comprising:

low-refractive index layers arranged at odd-numbered positions from a side opposite to the base member and having a refractive index of 1.45 to 1.52 at the first wavelength ($\lambda_1$); and high-refractive index layers arranged at even-numbered positions from the side opposite to the base member and having a refractive index of 1.65 to 1.80 at the first wavelength ($\lambda_1$) wherein layers arranged at the first, second and third positions from the side opposite to the base member each have an optical thickness ranging from $0.23\lambda_1$ to $0.28\lambda_1$.

13. The antireflection film according to claim 12, wherein the optical thicknesses, $d_1, d_2, d_3, d_4, d_5, d_6, d_7$ and $d_8$ of the films arranged at the first, second, third, fourth, fifth, sixth, seventh and eighth positions from the side opposite to the base member satisfy the following respective relationships:

$0.23\lambda_1 \leq d_1 \leq 0.28\lambda_1$
$0.23\lambda_1 \leq d_2 \leq 0.28\lambda_1$
$0.23\lambda_1 \leq d_3 \leq 0.28\lambda_1$
$0.72\lambda_1 \leq d_4 \leq 0.80\lambda_1$
$0.44\lambda_1 \leq d_5 \leq 0.52\lambda_1$
$0.76\lambda_1 \leq d_6 \leq 0.85\lambda_1$
$0.33\lambda_1 \leq d_7 \leq 0.41\lambda_1$
$0.40\lambda_1 \leq d_8 \leq 0.51\lambda_1$.

14. The antireflection film according to claim 12, wherein the optical thicknesses, $d_1, d_2, d_3, d_4, d_5, d_6, d_7$ and $d_8$ of the films arranged at the first, second, third, fourth, fifth, sixth, seventh and eighth positions from the side opposite to the base member satisfy the following respective relationships:

$0.23\lambda_1 \leq d_1 \leq 0.28\lambda_1$
$0.23\lambda_1 \leq d_2 \leq 0.28\lambda_1$
$0.23\lambda_1 \leq d_3 \leq 0.28\lambda_1$
$0.72\lambda_1 \leq d_4 \leq 0.80\lambda_1$
$0.44\lambda_1 \leq d_5 \leq 0.52\lambda_1$
$0.82\lambda_1 \leq d_6 \leq 0.92\lambda_1$
$0.25\lambda_1 \leq d_7 \leq 0.35\lambda_1$
$0.43\lambda_1 \leq d_8 \leq 0.53\lambda_1$.

15. The antireflection film according to claim 12, wherein the optical thicknesses, $d_1, d_2, d_3, d_4, d_5, d_6, d_7$ and $d_8$ of the films arranged at the first, second, third, fourth, fifth, sixth, seventh and eighth positions from the side opposite to the base member satisfy the following respective relationships:

$0.23\lambda_1 \leq d_1 \leq 0.28\lambda_1$
$0.23\lambda_1 \leq d_2 \leq 0.28\lambda_1$
$0.23\lambda_1 \leq d_3 \leq 0.28\lambda_1$
$0.23\lambda_1 \leq d_4 \leq 0.28\lambda_1$
$1.00\lambda_1 \leq d_5 \leq 1.20\lambda_1$
$0.52\lambda_1 \leq d_6 \leq 0.65\lambda_1$
$0.22\lambda_1 \leq d_7 \leq 0.31\lambda_1$
$0.96\lambda_1 \leq d_8 \leq 1.12\lambda_1$.

16. The antireflection film according to claim 12, wherein the high-refractive index layers are formed of a material comprising $Al_2O_3$ as a main component, and the low-refractive index layers are formed of a material comprising $SiO_2$ as a main component.

17. An optical element comprising:

a base member; and an antireflection film comprising an alternately multi-layered film of 8 layers formed on the base member and having antireflection characteristics in two wavelength regions including a first wavelength ($\lambda_1$) of 248 nm and a second wavelength ($\lambda_2$) of 633 nm as central wavelengths, respectively, wherein the multi-layered film of 8 layers comprises:

low-refractive index layers arranged at odd-numbered positions from a side opposite to the base member and having a refractive index of 1.45 to 1.52 at the first wavelength ($\lambda_1$); and high-refractive index layers arranged at even-numbered positions from the side opposite to the base member and having a refractive index of 1.65 to 1.80 at the first wavelength ($\lambda_1$), and wherein layers arranged at the first, second and third positions from the side opposite to the base member each have an optical thickness ranging from $0.23\lambda_1$ to $0.28\lambda_1$.

18. The optical element according to claim 17, wherein the optical thicknesses, $d_1, d_2, d_3, d_4, d_5, d_6, d_7$ and $d_8$ of the films arranged at the first, second, third, fourth, fifth, sixth, seventh and eighth positions from the side opposite to the base member in the antireflection film satisfy the following respective relationships:

$0.23\lambda_1 \leq d_1 \leq 0.28\lambda_1$
$0.23\lambda_1 \leq d_2 \leq 0.28\lambda_1$
$0.23\lambda_1 \leq d_3 \leq 0.28\lambda_1$
$0.72\lambda_1 \leq d_4 \leq 0.80\lambda_1$
$0.44\lambda_1 \leq d_5 \leq 0.52\lambda_1$
$0.76\lambda_1 \leq d_6 \leq 0.85\lambda_1$
$0.33\lambda_1 \leq d_7 \leq 0.41\lambda_1$
$0.40\lambda_1 \leq d_8 \leq 0.51\lambda_1$.

19. The optical element according to claim 17, wherein the optical thicknesses, $d_1, d_2, d_3, d_4, d_5, d_6, d_7$ and $d_8$ of the films arranged at the first, second, third, fourth, fifth, sixth, seventh and eighth positions from the side opposite to the base member in the antireflection film satisfy the following respective relationships:

$0.23\lambda_1 \leq d_1 \leq 0.28\lambda_1$
$0.23\lambda_1 \leq d_2 \leq 0.28\lambda_1$
$0.23\lambda_1 \leq d_3 \leq 0.28\lambda_1$
$0.72\lambda_1 \leq d_4 \leq 0.80\lambda_1$
$0.44\lambda_1 \leq d_5 \leq 0.52\lambda_1$
$0.82\lambda_1 \leq d_6 \leq 0.92\lambda_1$
$0.25\lambda_1 \leq d_7 \leq 0.35\lambda_1$
$0.43\lambda_1 \leq d_8 \leq 0.53\lambda_1$.

20. The optical element according to claim 17, wherein the optical thicknesses, $d_1, d_2, d_3, d_4, d_5, d_6, d_7$ and $d_8$ of the films arranged at the first, second, third, fourth, fifth, sixth, seventh and eighth positions from the side opposite to the base member in the antireflection film satisfy the following respective relationships:

$0.23\lambda_1 \leq d_1 \leq 0.28\lambda_1$
$0.23\lambda_1 \leq d_2 \leq 0.28\lambda_1$
$0.23\lambda_1 \leq d_3 \leq 0.28\lambda_1$
$0.23\lambda_1 \leq d_4 \leq 0.28\lambda_1$
$1.00\lambda_1 \leq d_5 \leq 1.20\lambda_1$
$0.52\lambda_1 \leq d_6 \leq 0.65\lambda_1$
$0.22\lambda_1 \leq d_7 \leq 0.31\lambda_1$
$0.96\lambda_1 \leq d_8 \leq 1.12\lambda_1$.

21. The optical element according to claim 17, wherein the high-refractive index layers are formed of a material comprising $Al_2O_3$ as a main component, and the low-refractive index layers are formed of a material comprising $SiO_2$ as a main component.

22. The optical element according to claim 17, wherein the base member is formed of quartz.

* * * * *

UNITED STATES PATENT AND TRADEMARK OFFICE
CERTIFICATE OF CORRECTION

PATENT NO. : 6,396,626 B1
DATED : May 28, 2002
INVENTOR(S) : Minoru Otani et al.

It is certified that error appears in the above-identified patent and that said Letters Patent is hereby corrected as shown below:

Column 10,
Line 50, "side" (2nd occurrence) should be deleted.

Column 12,
Line 7, "d8," should read -- $d_8$, --.

Signed and Sealed this

Third day of September, 2002

Attest:

JAMES E. ROGAN
Attesting Officer
Director of the United States Patent and Trademark Office